to provide the drive slots for the rotating disks. The ends
United States Patent
Crossman

[15] 3,698,519
[45] Oct. 17, 1972

[54] ARTICULATED DISC BRAKE CONFIGURATIONS

[72] Inventor: Richard L. Crossman, Tallmadge, Ohio

[73] Assignee: The Goodyear Tire & Rubber Company, Akron, Ohio

[22] Filed: Dec. 23, 1970

[21] Appl. No.: 101,033

[52] U.S. Cl............188/73.2, 188/218 XL, 192/70.2, 192/107 R
[51] Int. Cl..............................................F16d 65/12
[58] Field of Search......188/218 XL, 73.2; 192/70.2, 192/107 R

[56] References Cited

UNITED STATES PATENTS

| | | |
|---|---|---|
| 3,452,844 | 7/1969 | Lallemant............188/218 XL |
| 3,550,740 | 12/1970 | Le Blanc et al........192/107 R |
| 2,423,882 | 7/1947 | Frank..................188/218 XL |
| 3,422,936 | 1/1969 | Marcheron..........188/218 XL |
| 2,247,298 | 6/1941 | Kattwinkel.............192/107 R |
| 3,456,768 | 7/1969 | Holcomb, Jr........188/218 XL |

*Primary Examiner*—George E. A. Halvosa
*Attorney*—Oldham & Oldham

[57] ABSTRACT

The rotating disks of a multiple disk brake assembly are each formed of individual segments which are held together by clips and rivets. The clips also serve to provide the drive slots for the rotating disks. The ends of each segment are V-shaped to interlock with the adjacent segments. The stationary disks of the assembly may also be formed of individual segments joined together by links and rivets with adjacent ends of the segments being of interlocking configurations. The stationary disks and the backing and pressure plates of the brake assembly are provided with steel core plates and replaceable friction wear pads.

15 Claims, 11 Drawing Figures

INVENTOR
RICHARD L. CROSSMAN
BY:
Oldham & Oldham
ATTORNEYS

INVENTOR
RICHARD L. CROSSMAN
BY:
Oldham & Oldham
ATTORNEYS

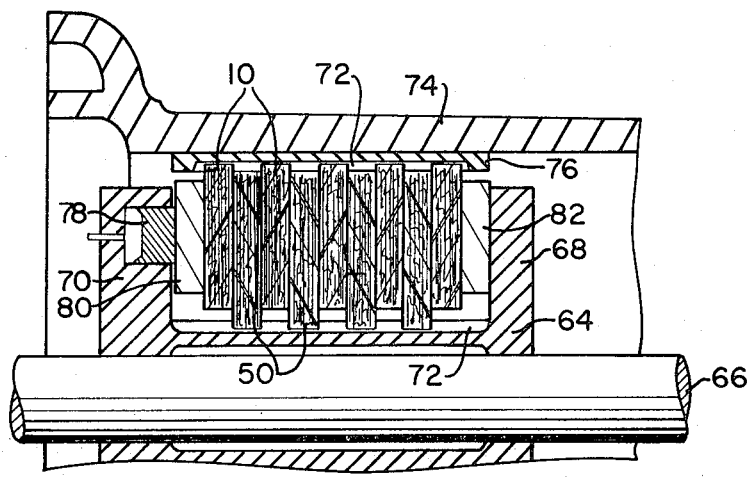
FIG.-9
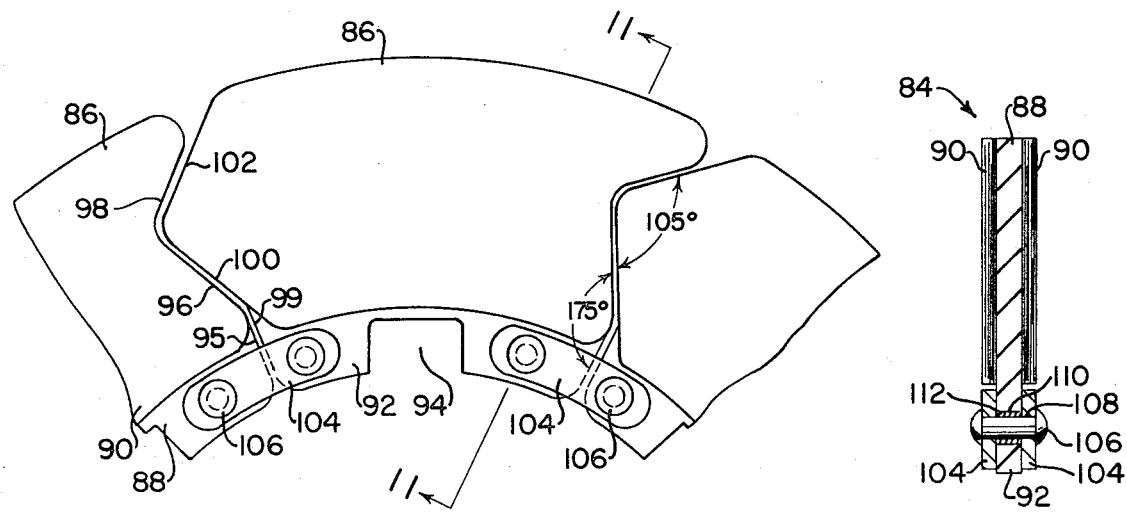
FIG.-10
FIG.-11
INVENTOR
RICHARD L. CROSSMAN
BY:
Oldham & Oldham
ATTORNEYS

ARTICULATED DISC BRAKE CONFIGURATIONS

The present invention relates to a disk brake assembly of the type having a number of alternate rotating and stationary disks carried between and axially movable between a backing plate and a pressure plate. More particularly, the invention relates to an improved disk construction for such a brake assembly.

Multiple disk brake assemblies are widely used in aircraft brake systems and other installations where high braking forces must be generated. The high mechanical and thermal stresses which are generated during the braking operation make it essential that the brake disks possess a high heat sink capacity, a high rate of durability, and a minimum rate of distortion.

Among the arrangements taught by the prior art to provide the necessary durability and reliability in a multiple disk brake assembly is the use of disks formed of a number of segments. These segmented disks, however, have certain limitations. The design of the individual segments together with the arrangements employed to join the segments into an annular disk contribute substantially to the production and maintenance costs of the disk assembly. The tendency of the individual segments to twist out of a truly concentric position results in one corner of the segment extending beyond the desired outer or inner circumference of the disks. The prior art segmented disk arrangements do not adequately limit this "saw toothing" action of the segments and can result in damage to the brake assembly due to interference between the projecting corners of the disk segments and the housing or torque tube of the brake assembly. The configuration of the individual segments which form the annular disks of the prior art are such that an excessive amount of vibration and noise is generated when the segmented disk is rotated relative to the adjacent disks during braking operation. This results from the passage of the leading and trailing edges of the segments across the junctures of the friction pads of the adjacent disks.

It is the primary object of the present invention to provide a multiple disk brake assembly having an improved segmented disk construction.

It is a further object of this invention to provide a brake disk which is characterized by its high heat sink capacity, durability, and minimum distortion.

It is also an object of the invention to provide a brake disk in the form of a segmented disk in which the segments are interlocked to prevent individual segments from twisting out of the concentric position, thus eliminating damage due to interference between the disk segments and the brake housing.

Another object of the invention is to provide a segmented brake disk for use in a multiple disk brake assembly which reduces the amount of noise and vibration produced during a braking operation.

A further object of the invention is to provide a brake disk assembly which may be more economically produced than conventional disks.

Another object of the invention is the provision of a rotating brake disk assembly which has a lower maintenance cost than conventional assemblies.

An additional object of the invention is the provision of an improved segmented brake disk which may be used to replace other brake disks in an existing brake assembly without requiring the modification of the brake assembly.

The above and other objects of the invention which will become apparent in the following detailed description are achieved by providing a brake disk for use as a rotating disk in a multiple disk brake assembly which is formed of individual segments held together by clips and rivets, with the segment ends being V-shaped to interlock with the adjacent segments. The clips are riveted to ears which are integrally formed at the corners of each segment. The clips also serve to provide drive slots for the disk. The stationary disks and the pressure and backing plates of the brake assembly are provided with steel cores and friction pads on the wear faces. The stationary disks may also be of segmented construction, employing links and rivets to join the segments together. The pads are formed of a sintered friction material and are riveted or otherwise secured to the cores.

For a more complete understanding of the invention and the objects and advantages thereof, reference should be had to the following detailed description and the accompanying drawings, wherein there is shown a preferred embodiment of the invention.

In the drawings:

FIG. 9 is a fragmentary sectional view of the brake assembly employing the disks of the present invention;

FIG. 10 is a fragmentary elevational view of a segmented stationary disk; and

FIG. 11 is a sectional view taken along the line 11—11 of FIG. 10.

Figure 3:
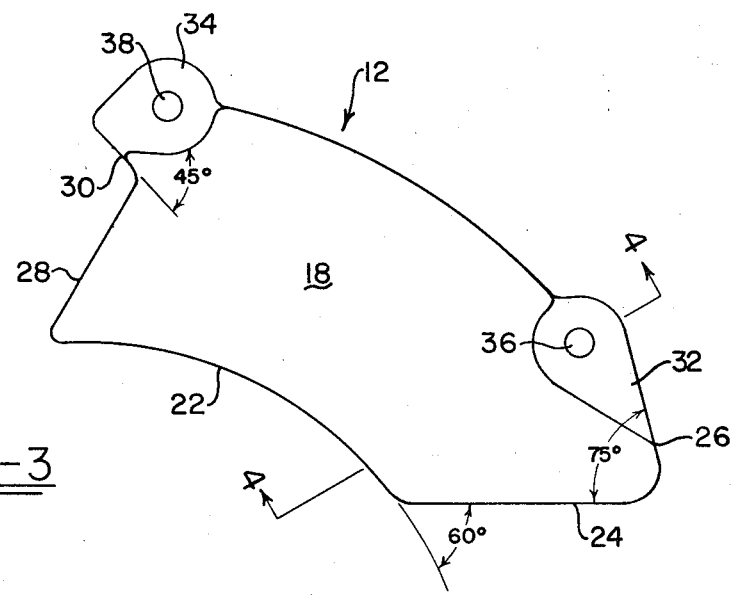
FIG. 3 is a side elevational view of one of the segments making up the disk of FIG. 1.
Figure 4:
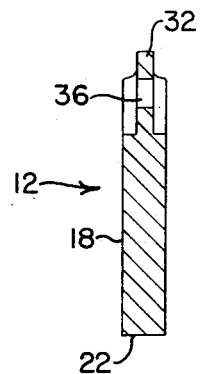
FIG. 4 is a sectional view taken along the line 4—4 of FIG. 3.

Referring first to FIGS. 1 through 6, the rotating disk of the brake assembly will now be described. The rotating disk, designated generally by the reference numeral 10, is formed of a number of identical segments 12. In the embodiment illustrated, there are six segments which, when joined together, form an annular ring. Clips 14 span the adjacent ends of each of the segments 12 and secure the segments together by means of rivets 16. Each of the segments 12 is formed of a friction material and has parallel opposite wear faces 18. It is contemplated that the segments may be formed by a precision punching operation to reduce the amount of machining of each segment and to reduce the production costs. The radially outer and inner edges 20 and 22, respectively, of each segment 12 are of concentric configuration. The ends of the segments are of V-shaped configurations. A typical end configuration is illustrated in FIG. 3 when the right end of the segment 12 has a radial inner straight portion 24 which is inclined at an angle of 60° from the tangent to the inner curved edge 22 of the segment 12 at the point of intersection of the straight portion 24 and the inner edge 22. The radially outer straight portion 26 of the segment end extends at a 75° angle to the inner portion 24. The opposite end of the segment is provided with complementary portions 28 and 30. At the radially outer ends of the segment there are provided ears 32 and 34 which, as can be seen from FIG. 4, are of reduced thickness and which project above the outer edge 20 of the segment 12. Holes 36 and 38 are provided in the ears 32 and 34, respectively. It should be noted that this arrangement permits the main portion of the segment 12 to be formed as a single mass of uniform thickness. This contributes to the strength of the segment, giving it greater resistance to distortion. The solid main portion of the segment also possesses a high heat sink capability.

Figure 5:
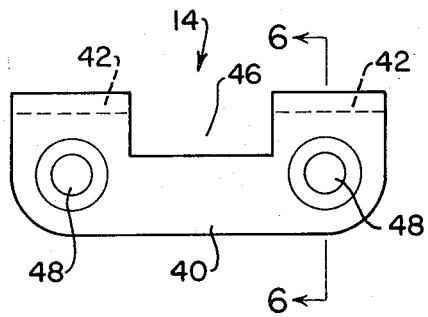
FIG. 5 is a side elevational view of one of the clips employed to secure the segments of the disk of FIG. 1.
Figure 6:
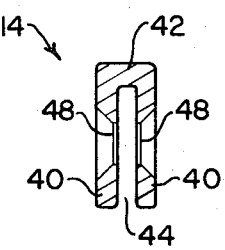
FIG. 6 is a sectional view taken along the line 6—6 of FIG. 5.

The clips 14 are shown in FIGS. 5 and 6. Each clip has spaced parallel side portions 40 which are joined by end portions 42 to provide a slot 44 in which the ears 32 or 34 of the disk segments 12 are received. The side portions 40 of the clips or links 14 are notched at 46 to provide drive notches for the disk assembly. Counter sunk holes 48 are provided at opposite ends of the side members 40 to receive the rivets 16 which secure the clips 14 to the ears 32 and 34 of the disks 12.

Figure 1:
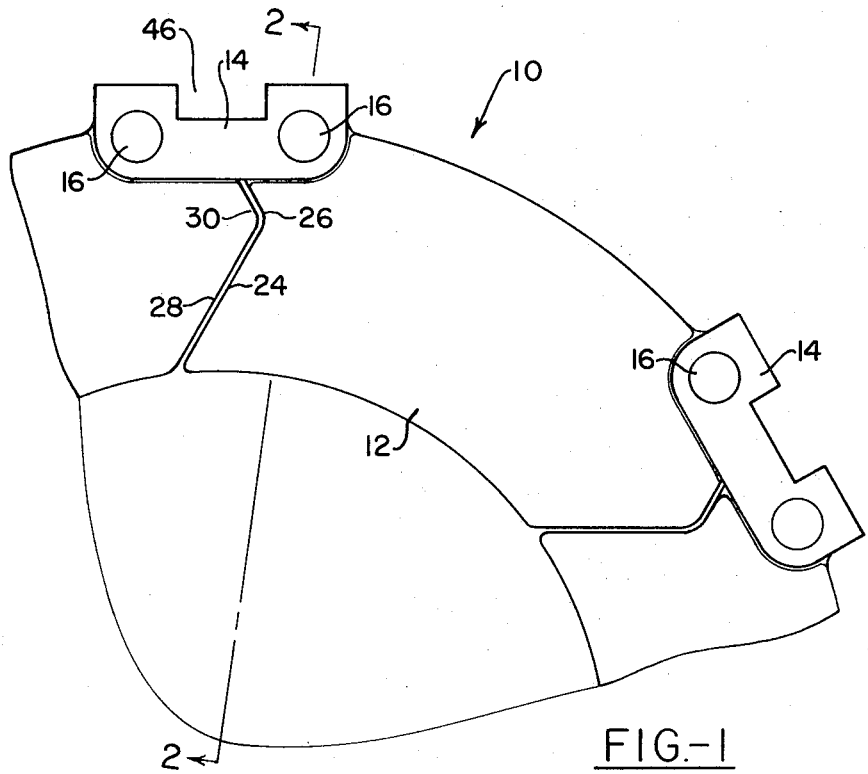
FIG. 1 is an elevational view of a rotating disk of the brake assembly.
Figure 2:
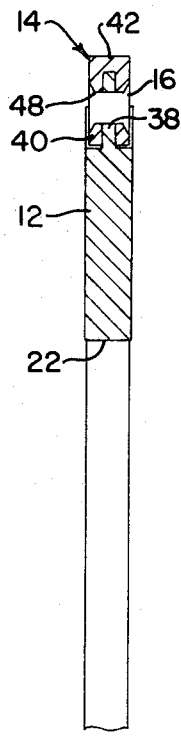
FIG. 2 is a sectional view taken along the line 2—2 of FIG. 1.

As can be seen from FIG. 1, the clips or links 14 hold the adjacent ends of the disk segments 12 a short distance from one another. This arrangement allows for thermal expansion of the disks without distortion. The complementary edges 24, 28 and 26, 30 of the adjacent ends of the segments 12 serve to properly align the adjacent segments and to prevent the segments from twisting out of the true concentric position, thus eliminating the undesirable "saw toothing" condition.

Figure 7:
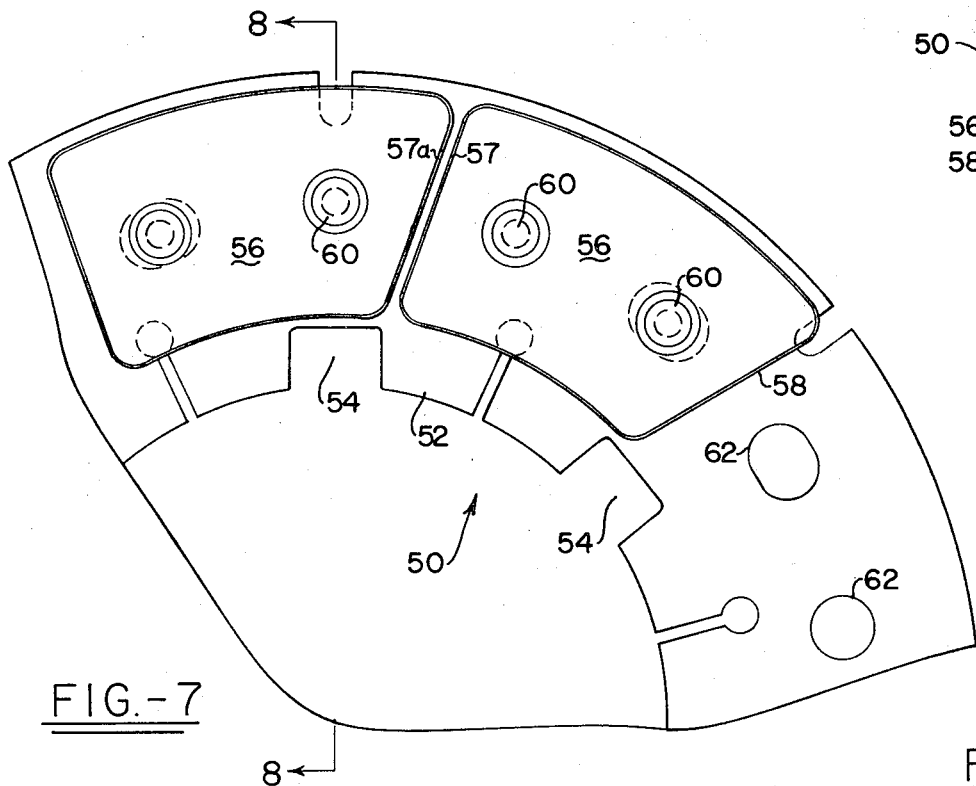
FIG. 7 is a fragmentary side elevational view of one of the stationary disks of the brake assembly, with one of the sintered friction pads removed to show the construction of the disk core.
Figure 8:
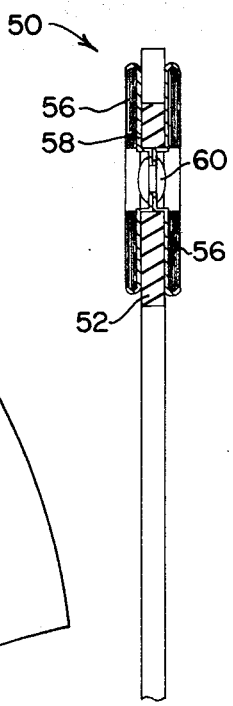
FIG. 8 is a sectional view taken along the line 8—8 of FIG. 7.

The construction of a stationary disk of the brake assembly is shown in FIGS. 7 and 8. The stationary disk, designated generally by the reference numeral 50, has a steel backing plate 52 in the form of an annular ring with notches 54 on its inner circumference for engaging the splines of the housing. Friction wear pads 56 are carried in cup-like members 58 which are secured by rivets 60 passing through holes 62 in the backing plates 52. The construction of the backing and pressure plates of the brake assembly is similar, wear pads being riveted to only one face of each of these plates, however.

It should be noted that the ends 57 and 57a of the wear pads 56 are straight rather than V-shaped. This arrangement in combination with the V-shaped ends of the rotating disk segments 12 serves to provide a smoother transition of the segments 12 from one pad 56 to the adjacent pad during rotation of the disk 12 since the V-shaped ends provide leading and trailing portions which overlap two adjacent wear pads 56. As a result, the amount of noise and vibration produced during brake operation is reduced substantially from that produced by conventional rotating and stationary disks. The smooth transition achieved also serves to reduce wear and, hence, prolong the useful life of both the segments 12 and the wear pads 56.

A segmented stationary disk construction is illustrated in FIGS. 10 and 11. This disk, designated generally by the numeral 84, is comprised of a number of identical segments 86 which are joined together to form the annular disk. Each segment 86 has a steel core plate 88 and friction pads 90 bonded to the opposite faces thereof. The core plate 90 extends radially inwardly beyond the pads 90, as indicated at 92, and is provided with a notch 94 for engaging a spline of the fixed brake housing. The ends of each segment 86 are of a generally V-shaped configuration. This can be seen in FIG. 10 where the radially inner portion 95 of one end of the segment 86 is parallel to the radius from the center of the disk 84 to the radially inner end of the portion 92 of the core 88. The intermediate portion 96 of this end of the segment 86, which is the radially inner portion of the friction pad 90, is inclined at a 175° angle to the inner portion 95. The radially outer portion 98 of this end extends at a 105° angle to the intermediate portion 96. The corresponding portions 99, 100, and 102 of the opposite end of each segment 86 are of complementary configuration so as to be parallel to the portions 95, 96, and 98, respectively, of the end of the adjacent segment. It should be noted that the V-shaped ends of the segments 86 of the stationary disk 84 face in the opposite direction relative to the ends of the segments 12 of the rotating disk 10. This assures a smooth transition of the segments 12 across the segments 86 to reduce vibration, noise, and wear of the brake disks.

The individual segments 86 are joined to one another to form the stationary disk 84 by means of links 104. These short links 104 span the ends of adjacent disk segments 86 on either side of the segments and are held in place by rivets 106 which pass through holes 108 in the links 104 and through holes 110 in the inner portions 92 of the segment core plates 88. Bushings or sleeves 112 are provided in the holes 110.

The brake assembly is shown somewhat schematically in FIG. 9. A housing 64 is secured to a fixed axle 66. This housing has an end plate 68 at one end, a second end plate 70 at the opposite end, and a series of splines 72 extending axially between the end plates. A rotating wheel assembly 74 is carried on the fixed axle 66 by suitable bearings, not shown. A series of axially extending splines 76 are provided on the inner circumference of the wheel assembly 74. The housing end 70 is provided with a piston arrangement 78. Alternate ones of the rotating disks 10 and stationary disks 50 or 84 are carried between the housing ends 68 and 70 with the drive notches of the rotating disks 10 engaging the splines 76 of the rotating wheel while the drive notches of the stationary disks 50 or 84 engage the splines 72 of the fixed housing. A pressure plate 80 is provided between the pistons 78 and the first disk of the series. This plate 80 is axially movable between the housing ends 68 and 70 and is provided with notches which engage the spline 72 of the fixed housing 64. A backing plate 82 is provided on the rear end 68 of the housing 64. Braking action is achieved by forcing the pressure plate 80 axially toward the second end 68 of the housing 64 to apply clamping pressure to the series of rotating and stationary disks.

With the exception of the construction of the disks, the brake assembly may be of conventional construction. Thus, the improved disks of the present invention may readily be retrofitted to existing brake units to improve the capability and durability of such units.

While in accordance with the Patent Statutes, only the best known embodiments of the invention have been described and illustrated in detail, the invention is not so limited. Reference should therefore be had to the following claims in determining the true scope of the invention.

What is claimed is:

1. A brake disk for use in a brake assembly of the type having a number of alternate rotating and stationary disks carried between and axially movable between a backing plate and a pressure plate, comprising:

a plurality of identical arcuate segments formed of a friction material and together forming an annular disk, each segment having circumferentially spaced ends and radially spaced sides with substantially the entire faces of the adjacent ends of the segments being of complementary V-shaped configuration;

a plurality of links, the links being arranged on one circumference of the disk and outside the rubbing area of the disk, each link spanning the ends of adjacent disks; and means to secure the links to the disks.

2. The brake disk according to Claim 1 wherein the disk is a rotating disk, the links being located adjacent the outer circumference of the disk and including notches for engaging drive splines of the wheel.

3. The brake disk according to claim 1 wherein the first end of each segment has a radially inner portion which extends at a 60° angle to the tangent to the inner curved edge of the segment at the point of intersection of the inner curved edge and the radially inner portion of the first end and a radially outer portion extending at a 75° angle to the inner portion.

4. The brake disk according to claim 1 wherein the means to secure the links and segments are rivets.

5. The brake disk according to claim 1 wherein the number of segments forming the brake disc is equal to the number of keys of the corresponding member of the brake assembly, the links being notched to receive the keys.

6. The brake disk according to claim 1 wherein the disk is a stationary disk, the links being located adjacent the inner circumference of the disk.

7. The brake disk according to claim 1 wherein each segment has ear portions at its first and second ends, the ear portions being of lesser thickness than the remainder of the segment and extending beyond one of the arcuate edges of the segment each link extending over and secured to the ear portions of adjacent ends of adjacent segments.

8. The brake disk according to claim 7 wherein each link has a pair of parallel side members spaced from one another by the thickness of the ear portions of the segments, the combined thicknesses of the side members and the ear portion being substantially equal to the thickness of the body portion of the segment.

9. The brake disk according to claim 8 wherein the pair of side members of each link have aligned notches for engaging axially extending splines of the brake assembly.

10. A brake assembly comprising an axle, a housing secured to the axle, a first set of disks keyed to the housing for axial movement, a wheel rotatably mounted on the axle, a second set of annular disks keyed to the wheel for axial movement, the disks of the first and second sets being in an interleaved arrangement, a backing plate secured to the housing at one end of the sets of disks, a pressure plate at the opposite end of the sets of disks keyed to the housing for axial movement, and means to apply an axially directed force to the pressure plate to effect axial movement thereof toward the disks; the assembly being characterized in that each disk of one of the sets of disks is comprised of:

a plurality of identical arcuate segments, each segment having circumferentially spaced ends and radially spaced sides with substantially the entire faces of the adjacent ends of the segments being of complementary V-shaped configuration;

a plurality of links, the links being arranged on one circumference of the disk and outside the rubbing surface of the disk, each link connecting two adjacent segments across their ends to form an annular disk and incorporating means for keying the disk to the respective one of the wheel and axle.

11. The brake assembly according to claim 10 wherein at least the wear faces of the disks of the other set of disks are segmented, the leading and trailing edges of the segmented wear faces being of different configurations than the leading and trailing edges of the segments of the one set of disks.

12. The brake assembly according to claim 11 wherein each disk of the other set of disks comprises an annular core plate and a plurality of wear faces secured to each side of the core plate.

13. The brake assembly according to claim 12 wherein the one set of disks comprise the second set of disks, the clips being located at the outer circumference of the disks and including notches for engaging the keys of the wheel, and the other set of disks comprise the first set of disks, the core plates being provided with notches on their inner circumferences to engage the keys of the housing.

14. The brake assembly according to claim 11 wherein each disk of the other set of disks is comprised of a plurality of identical arcuate segments, each segment having a steel core plate and friction pads secured to the opposite faces of the core plate, a plurality of links spanning adjacent segments, and means securing the links to the segments.

15. The brake assembly according to claim 14 wherein the other set of disks comprises the first set of disks, the core plates of the segments extending radially inward beyond the friction pads, and the core plates having notches on the inner circumferences thereof for engaging the keys of the housing.

* * * * *